US008941872B1

(12) United States Patent
Lellouche et al.

(10) Patent No.: US 8,941,872 B1
(45) Date of Patent: Jan. 27, 2015

(54) PRINT TECHNOLOGY WITHOUT CLIENT-SIDE DOWNLOAD

(71) Applicant: News America Marketing Properties, LLC, New York, NY (US)

(72) Inventors: Henri Lellouche, Fairfield, CT (US); Andrew Grussi, Oxford, CT (US); Taylor Henry Witt, Wilton, CT (US); William Christie, Fairfield, CT (US); Vivek Thirumurugan Muthukrishnan, Milford, CT (US)

(73) Assignee: News America Marketing Properties, LLC, New York, NY (US)

( * ) Notice: Subject to any disclaimer, the term of this patent is extended or adjusted under 35 U.S.C. 154(b) by 0 days.

(21) Appl. No.: 14/120,262

(22) Filed: May 14, 2014

(51) Int. Cl.
*G06F 3/12* (2006.01)

(52) U.S. Cl.
CPC ............ *G06F 3/1226* (2013.01); *G06F 3/1285* (2013.01)
USPC .......................................... 358/1.15; 358/1.1

(58) Field of Classification Search
None
See application file for complete search history.

(56) References Cited

U.S. PATENT DOCUMENTS

| 7,124,094 | B1 * | 10/2006 | Kobayashi et al. .............. 705/64 |
| 8,792,114 | B2 * | 7/2014 | Stewart et al. ................ 358/1.15 |
| 2004/0057075 | A1 * | 3/2004 | Stewart et al. ................ 358/1.15 |

OTHER PUBLICATIONS

Adobe Systems Incorporated, "Adobe LiveCycle & Illinois Department of Human Services", retrieved from http://www.adobe.com/products/livecycle.html on Mar. 13, 2014.

Adobe Systems Incorporated, "LiveCycle Developer Center", retrieved from http://www.adobe.com/devnet/livecycle.html on Mar. 13, 2014.

Adobe Systems Incorporated, "Tools/Designer ES4", retrieved from http://www.adobe.com/products/livecycle/tools/designer.html on Mar. 13, 2014.

Drupal.org, "Homepage", retrieved from https://www.drupal.org/ on Mar. 13, 2014.

LockLizard Limited, "Homepage", retrieved from http://www.locklizard.com/ on Mar. 13, 2014.

LockLizard Limited, "Lizard Safeguard PDF Security", retrieved from http://www.locklizard.com/pdf_security.htm on Mar. 13, 2014.

ThreatMetrix, "Advanced Online Fraud Prevention: Eliminate Payment Fraud and Account Takeover", retrieved from www.threatmetrix.com on Mar. 13, 2014.

ThreatMetrix, "Trust Defender ID from ThreatMetrix", retrieved from www.threatmetrix.com, Mar. 2013.

ThreatMetrix, "TrustDefender Cloud from ThreatMetrix", retrieved from www.threatmetrix.com on Mar. 13, 2014.

* cited by examiner

*Primary Examiner* — Marcus T Riley
(74) *Attorney, Agent, or Firm* — Foley & Lardner LLP

(57) ABSTRACT

System, method and program product, comprising computers configured with components to receive access data from a device for an item that may be printed and validated; access a device identity computer that determines a device identity based at least in part on X parameters; obtain risk data associated with that ID; access a database that lists a number of item copies associated with the ID; determine based on the print number data or risk data, whether to transmit the image data; transmit the image data containing a print request element but missing an essential element for validation; receive activation for the print request element; record print number data based on a number of times the activation data has been received; obtain the missing essential element for validation, bypass dialog communication with the device and transmit to a print spooler the basic print image data and the missing essential element for validation.

21 Claims, 5 Drawing Sheets

PRINT TECHNOLOGY WITHOUT CLIENT-SIDE DOWNLOAD

BACKGROUND

Current marketplace solutions cannot offer a secure solution to control/limit printing without the need for client-side software. Those solutions which do offer security on the number of prints allowed on a device via client-side software, either require a software package installation or require pre-installed software already on the end users device to be leveraged. There are other companies in the marketplace which allow the printing of coupons and other items without the need for the end user to install software on their device, but these companies do not offer the security to limit the number of prints allowed on that device.

Installation of a software package in order to transmit a unique device ID in order to control/limit printing causes multiple issues for user devices. Given the broad range of devices that can be used to access a website, no one software installation package works well with all types of devices. Different hardware (Apple, HP, Acer, etc.), Operating Systems (MAC, Windows, UNIX, etc.) and browsers (Chrome, Firefox, Internet Explorer, etc.) combinations all have their own unique constraints and challenges.

SUMMARY OF THE INVENTION

In embodiments, a program product for operating a server method on one or more computers for passive print security is disclosed, comprising a non-transitory computer-readable medium holding computer-readable code thereon, that when executed by the one or more computers, causes the one or more computers to perform the steps: receiving, by the one or more computers, access data from a device via one or more networks; receiving request data from the device, by the one or more computers via the one or more networks, requesting a given item that may be printed and validated; accessing, by the one or more computers via the one or more networks, a device identity computer that determines a device identity based at least in part on X parameters, where X is more than 10 parameters; receiving, by the one or more computers via the one or more networks, an ID that was created by the device identity computer based at least in part on the X parameters; receiving or obtaining by the one or more computers via the one or more networks, risk data associated with that ID; accessing, by the one or more computers, a database to obtain print number data based on a number of copies of the given item that are associated with the ID and/or to obtain a total number of copies made of the given item; determining, by the one or more computers, based at least in part on one or more selected from the group of the risk data, the print number data based on the number of copies of the given item associated with ID, and the total number of copies made of the given item, whether or not to transmit or make accessible basic print image data for a basic print image of the given item; obtaining and transmitting or making accessible, by the one or more computers via the one or more networks, the basic print image data for the basic print image containing a print request element within the basic print image but missing an essential element for validation, when the determining step determines to transmit or make accessible the basic print image data for the given item; receiving, by the one or more computers via the one or more networks, activation data indicating that the print request element within the basic print image has been activated; recording or having recorded, by the one or more computers in the database, print number data based on a number of times the activation data has been received for the given item, with the print number data associated with the given item and the ID that had been created based at least in part on the X parameters; determining, by the one or more computers, whether or not the print number data exceeds a threshold value; obtaining, by the one or more computers, the missing essential element for validation, when the determining step for the print number data does not exceed the threshold value; and bypassing or deactivating any dialog or print settings communication with the device on printing parameters and transmitting or making accessible to a print spooler associated with the device, by the one or more computers via the one or more networks, the basic print image data and the missing essential element for validation.

In embodiments, computer-readable program code may be provided to perform the step: adding, by the one or more computers, the missing essential element into a field within the basic print image.

In embodiments, computer-readable program code may be provided to perform the step: determining, by the one or more computers via a communication with the print spooler via the one or more networks, whether it is an allowed printer or not an allowed printer; and preventing, by the one or more computers, transmitting or making accessible to the print spooler associated with the device, both the basic print image data and the missing essential element for validation, when it is determined that the print spooler is not an allowed printer.

In embodiments, the obtaining the missing essential element for validation step comprises generating, by the one or more computers, the missing essential element.

In embodiments, computer-readable program code may be provided to perform the steps: generating or obtaining, by the one or more computers, graphical image data for a PIN; and adding, by the one or more computers, the graphical image data for the PIN to the missing essential element for printing on the coupon.

In embodiments, the obtaining the missing essential element for validation step may comprise accessing, by the one or more computers, a coupon server.

In embodiments, the obtaining the missing essential element for validation step may comprise: accessing, by the one or more computers, a coupon server to obtain a number; and generating, by the one or more computers, graphical image data representing the number as the missing essential element for validation.

In embodiments, computer-readable program code may be provided to perform the steps: initiating when the access data is received, by the one or more computers and the one or more networks, an addition of a tracking cookie on the device.

In embodiments, computer-readable program code may be provided to perform the steps: detecting, when the access data is received, by the one or more computers via the one or more networks, a tracking cookie on the device associated with the server method; obtaining from the tracking cookie, by the one or more computers via the one or more networks, history data including print number data for one or more items that may be printed and validated; determining, based at least in part on the history data, whether there is print number data for the given item; comparing, by the one or more computers, the print number data for the given item with the threshold value; and wherein the determining whether or not to transmit or make accessible the base print image data is based at least in part on results from the comparing step.

In embodiments, computer-readable program code may be provided to perform the steps: selecting, by the one or more computers via the one of more networks, a plurality parameters on the device identity computer; and setting or having set, by the one or more computers via the one of more networks, respective score values for the respective parameters selected, for use by the device identity computer in determining risk.

In embodiments, the basic print image data may be PDF data.

In embodiments, the essential element may comprise bar code data.

In embodiments, the obtaining the basic print image data step may comprise accessing, by the one or more computers, one selected from the group of a coupon server, a gift certificate server, and a voucher server.

Embodiments of a system for passive print security is disclosed, comprising: one or more computers configured with the following components: a communications component configured to receive, by the one or more computers via one or more networks, access data from a device; the communications component configured to receive request data from the device, by the one or more computers via the one or more networks, requesting a given item that may be printed and validated; the communications component configured to access, by the one or more computers via the one or more networks, a device identity computer that determines a device identity based at least in part on X parameters, where X is more than 10 parameters; the communications component configured to receive, by the one or more computers via the one or more networks, an ID that was created by the device identity computer based at least in part on the X parameters; the communications component configured to receive or obtain, by the one or more computers via the one or more networks, risk data associated with that ID; the communications component configured to access, by the one or more computers, a database to obtain print number data based on a number of copies of the given item that are associated with the ID and/or to obtain a total number of copies made of the given item; a processor configured, by the one or more computers, to determine based at least in part on one or more selected from the group of the risk data, the print number data based on the number of copies of the given item associated with ID, and the total number of copies made of the given item, whether or not to transmit or make accessible basic print image data for a basic print image of the given item; the processor configured to obtain and transmit or make accessible, by the one or more computers via the one or more networks, the basic print image data for the basic print image containing a print request element within the basic print image but missing an essential element for validation, when the determining step determines to transmit or make accessible the basic print image data for the given item; the communications component configured to receive, by the one or more computers via the one or more networks, activation data indicating that the print request element within the basic print image has been activated; the processor configured to record or having recorded, by the one or more computers in the database, print number data based on a number of times the activation data has been received for the given item, with the print number data associated with the given item and the ID that had been created based at least in part on the X parameters; the processor configured to determine, by the one or more computers, whether or not the print number data exceeds a threshold value; the processor configured to obtain, by the one or more computers, the missing essential element for validation, when the determining operation for the print number data does not exceed the threshold value; and the processor configured to bypass or deactivate any dialog or print settings communication with the device on printing parameters and to transmit or make accessible to a print spooler associated with the device, by the one or more computers via the one or more networks, the basic print image data and the missing essential element for validation.

In embodiments, the processor may be configured to: add, by the one or more computers, the missing essential element into a field within the basic print image.

In embodiments, the processor may configured to: determine, by the one or more computers via a communication with the print spooler via the one or more networks, whether it is an allowed printer or not an allowed printer; and prevent, by the one or more computers, transmitting or making accessible to the print spooler associated with the device, both the basic print image data and the missing essential element for validation, when it is determined that the print spooler is not an allowed printer.

In embodiments, the processor may be configured to obtain the missing essential element by generating, by the one or more computers, the missing essential element.

In embodiments, the processor may be further configured to: generate or obtain, by the one or more computers, graphical image data for a PIN; and add, by the one or more computers, the graphical image data for the PIN to the missing essential element for printing on the coupon.

In embodiments, the obtaining the missing essential element for validation operation may comprise accessing, by the one or more computers, a coupon server.

In embodiments, the processor may be configured to: detect, when the access data is received, by the one or more computers via the one or more networks, a tracking cookie on the device associated with the server method; obtain from the tracking cookie, by the one or more computers via the one or more networks, history data including print number data for one or more items that may be printed and validated; determine, based at least in part on the history data, whether there is print number data for the given item; and further comprising a comparator, configured by the one or more computers, to compare the print number data for the given item with the threshold value; and wherein the determining whether or not to transmit or make accessible the base print image data operation is based at least in part on results from the comparator.

In embodiments, the processor may be further configured to: select, by the one or more computers via the one of more networks, a plurality of the Y parameters on the device identity computer; and set or have set, by the one or more computers via the one of more networks, respective score values for the respective parameters selected, for use by the device identity computer in determining risk.

Embodiments of a method for operating a server on one or more computers, for passive print security is disclosed, comprising: A method for operating a server method on one or more computers, for passive print security, comprising: receiving, by one or more computers, access data from a device via one or more networks; receiving request data from the device, by the one or more computers via the one or more networks, requesting a given item that may be printed and validated; accessing, by the one or more computers via the one or more networks, a device identity computer that determines a device identity based at least in part on X parameters, where X is more than 10 parameters; receiving, by the one or more computers via the one or more networks, an ID that was created by the device identity computer based at least in part on the X parameters;

receiving or obtaining by the one or more computers via the one or more networks, risk data associated with that ID; accessing, by the one or more computers, a database to obtain print number data based on a number of copies of the given item that are associated with the ID and/or to obtain a total number of copies made of the given item; determining, by the one or more computers, based at least in part on one or more selected from the group of the risk data, the print number data based on the number of copies of the given item associated with ID, and the total number of copies made of the given item, whether or not to transmit or make accessible basic print image data for a basic print image of the given item; obtaining and transmitting or making accessible, by the one or more computers via the one or more networks, the basic print image data for the basic print image containing a print request element within the basic print image but missing an essential element for validation, when the determining step determines to transmit or make accessible the basic print image data for the given item; receiving, by the one or more computers via the one or more networks, activation data indicating that the print request element within the basic print image has been activated; recording or having recorded, by the one or more computers in the database, print number data based on a number of times the activation data has been received for the given item, with the print number data associated with the given item and the ID that had been created based at least in part on the X parameters; determining, by the one or more computers, whether or not the print number data exceeds a threshold value; obtaining, by the one or more computers, the missing essential element for validation, when the determining step for the print number data does not exceed the threshold value; and bypassing or deactivating any dialog or print settings communication with the device on printing parameters and transmitting or making accessible to a print spooler associated with the device, by the one or more computers via the one or more networks, the basic print image data and the missing essential element for validation.

In embodiments, a method for operating a server method on one or more computers, for passive print security, consistent with the invention may comprise: receiving, by one or more computers, access data from a device via one or more networks; receiving request data from the device, by the one or more computers via the one or more networks, requesting a given item that may be printed and validated; accessing, by the one or more computers via the one or more networks, a device identity computer that determines a device identity based at least in part on X parameters, where X is more than 10 parameters; receiving, by the one or more computers via the one or more networks, an ID that was created by the device identity computer based at least in part on the X parameters; receiving or obtaining, by the one or more computers, risk data associated with that ID; accessing, by the one or more computers, a database that to obtain print number data based on a number of copies of the given item associated with the ID; obtaining and transmitting or making accessible, by the one or more computers via the one or more networks, the basic print image data for the basic print image containing a print request element within the basic print image but missing an essential element for validation; receiving, by the one or more computers via the one or more networks, activation data indicating that the print request element within the basic print image has been activated; determining, by the one or more computers, whether or not the print number data exceeds a threshold value; determining, by the one or more computers, whether or not to obtain the missing essential element, based at least in part on the risk data and/or whether the print number data based on the number of copies exceeds the threshold value; obtaining, by the one or more computers, the missing essential element for validation, based at least in part on determining to obtain the missing essential element in the determining step; and bypassing or deactivating any dialog or print settings communication with the device on printing parameters and transmitting or making accessible to a print spooler associated with the device, by the one or more computers via the one or more networks, the basic print image data and the missing essential element for validation.

BRIEF DESCRIPTION OF THE DRAWINGS

The above and related objects, features and advantages of the present invention, will be more fully understood by reference to the following detailed description of the exemplary embodiments of the present invention, when taken in conjunction with the following exemplary figures, wherein.

DETAILED DESCRIPTION OF THE EMBODIMENTS

The claimed invention circumvents the need for a client-side installation or the leveraging of already installed client-side software in favor of a passive approach that gathers a truly reliable unique persistent identifier for the device that is not bounded by the restraints imposed by the particular client-side hardware, operating systems and browsers. The invention allows secure printing of coupons and other items while in embodiments, eliminating the need for a client-side software installation on the client device. The present invention uses this passive approach for obtaining an identifier (ID) for the user device, coupled with an essential validation element withholding process to obtain security.

With this new process, no client-side software installation is necessary to gather the ID of the device and therefore maintains the security of the print solution. Once the unique device ID is established, the number of prints per device can be controlled by transmitting a secure PDF document to the device printer. The PDF document will include the ability to control the number of times a consumer is allowed to print and may in embodiments, include other security features such as geofencing, PIN entry, etc.

Thus, embodiments of this new process no longer require the consumer to download client-side software. The process gathers device data from a website access which can then be used to determine the uniqueness of the user's device. Thus, the security required by coupon sponsors is obtained without the reliance on client-side software.

Figure 1:
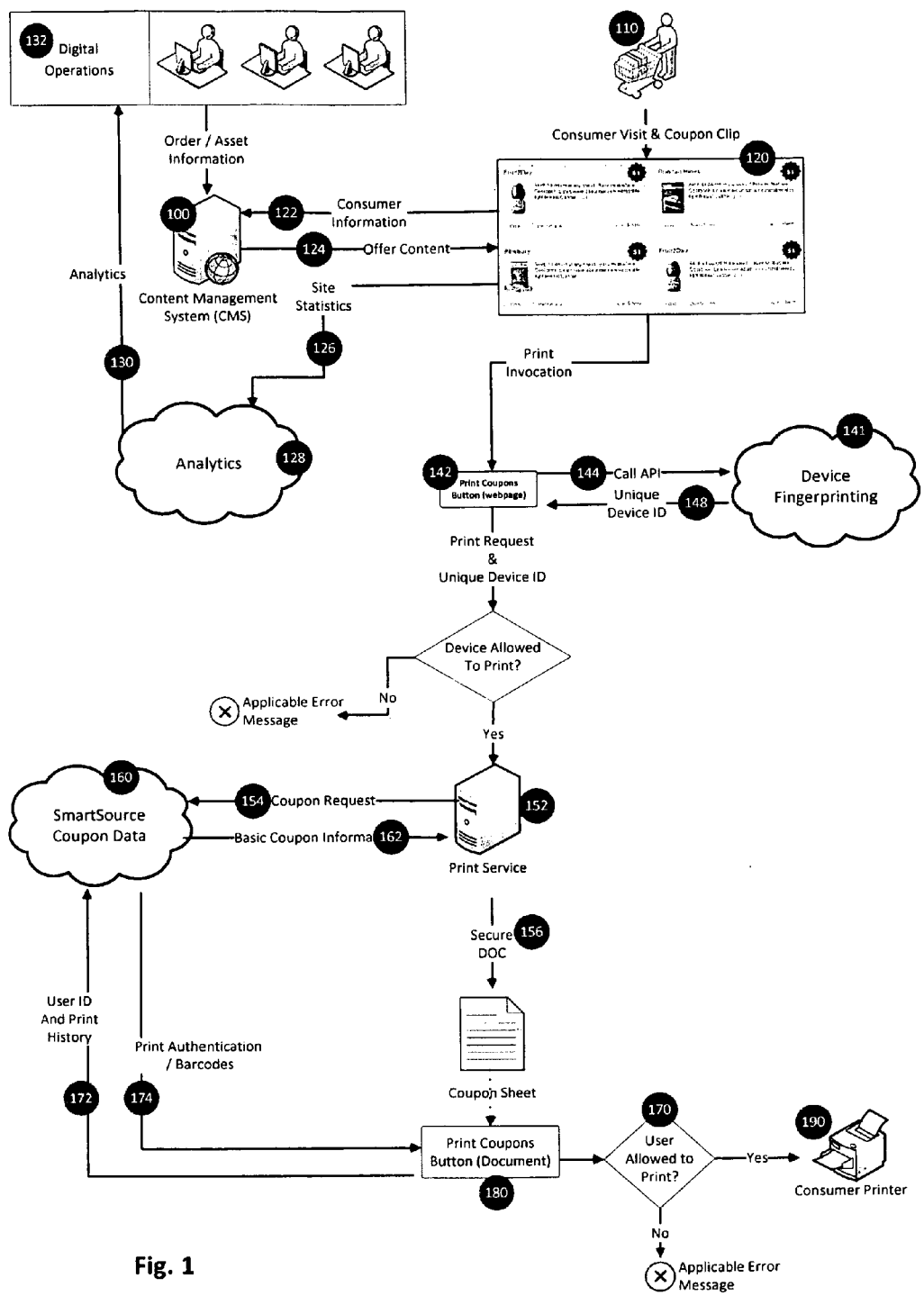
FIG. 1 is a schematic diagram of embodiments of an overall system consistent with the present invention.

Referring to FIG. 1, embodiments of a basic system consistent with the invention are disclosed. A website server 120 configured in one or more computers may receive a visit via one or more networks from a consumer device 110, e.g., a personal computer, a smartphone, a personal digital assistant, to name a few. In embodiments, the website server may be a coupon website server. In embodiments, the website server may be a gift certificate website server. In embodiments, the website server may be a voucher website server. FIG. 1 illustrates coupons from different coupon sponsors in block 120, as an example.

Access data from the consumer device access may be obtained and forwarded via line 122 to a content management system (CMS) 100. Data from one or more cookies residing on the consumer device 110 may be queried for data on previous accesses to the site, and provided to the CMS 100. The CMS 100 may then provide offer content via line 124 back to the server 120, where the offer content may be made accessible/served to the consumer device 110. In embodiments, data for site statistics may be obtained via line 126 and provided to an analytics server 128 for compiling the site statistics. Analytics data may also be provided via line 130 to an analysis server and operation 132. This analysis may include a risk calculation based on data obtained from the one or more cookies.

Request data may then be received at website server 120, via the one or more networks, requesting that a given item be printed. This request data is represented schematically by block 142. This request data may be generated by the website server detecting data that a print button or other element has been activated on a webpage. In embodiments, the content management system 100 may generate metadata for the print request to be sent to a print server 152, to be discussed below. In embodiments, a script on the website server 120 may be triggered to execute to generate queries and other communications via the one or more networks with the consumer device 110 to collect data for parameter to be used in generating a unique identifier (ID).

The website server 120 may then access, via line 144 (representing one or more networks), a device identity computer 141, and provide the parameter data obtained by the script. The device identity computer 141 will then determine a unique device identity based at least in part on X parameters, where X is more than 10 parameters, and in embodiments, may be at least 30 parameters. In embodiments, the access to the device identity computer 141 may be via an application programming interface (API). In embodiments, over 200 different parameters may be used to determine a device ID based at least in part on the combination of parameters determined from the access data and parameter data. In some embodiments, a threshold number of more than 10 parameters may be used to determine a unique ID, and in embodiments, the threshold may be 30 parameters. As an example, parameter data may be obtained from browser attributes, plug-in attributes, TCP/IP connection attributes, cookie attributes, packet fingerprint recognition, to name a few, contained or derivable from the access data and parameter data.

In embodiments, the device identity computer may be controlled by the system. In other embodiments, an outside identity service computer may be accessed. For example, ThreatMetrix® TrustDefender™ Cloud may be used for fingerprinting of the device based on its access data and parameter data to obtain a unique ID. Alternative passive device fingerprinting solutions are also available based on a plurality of parameters.

Line 148 represent a unique ID generated by the device identity server 141 based at least in part on the X parameters obtained from the access data. Additionally, the device identity server 141 in embodiments may also provide risk data accumulated based at least in part on activity recorded against this ID. In other embodiments, risk data may be obtained from a server different from the device identity server 141, or may be obtained by accessing one or more databases. In embodiments, the risk data may be generated based at least in part on data compiled by accessing a plurality of databases that contain data on individual types of risk.

In embodiments, the print request, the ID and the risk data may be provided to a print service computer 152. In embodiments, the print service computer may access a database (using the ID as a key) to obtain print number data based on a number of copies of the given item that are associated with the ID and/or to obtain a total number of copies made of the given item.

In embodiments, the print service computer 152 may then determine, based at least in part on one or more selected from the group of the risk data, the print number data based on the number of copies of the given item associated with ID, and the total number of copies made of the given item, whether or not to transmit or make accessible basic print image data for a basic print image of the given item. In embodiments, the determination may always be based at least in part on the risk data. In embodiments, the determination may always be based on all of the items in the group. This determination decision point for the print server computer 152 is represented in the figure by the diamond decision logic block "Device Allowed to Print?" In embodiments, this determination may comprise comparing in a comparator the print number data based on the number of copies of the given item associated with the ID to a print number threshold value, and/or may comprise comparing in a comparator the risk data to a risk threshold value. If either of the thresholds is met, or in embodiments if both are met, then the print service computer 152 may determine not to allow printing of the given item. In embodiments, the risk data may comprise a risk score, which risk score may be compared to the risk threshold value. Note that there may be multiple different risk threshold values or ranges of risk threshold values. If the risk score falls within a given range of risk threshold values, then in embodiments, additional data may be accessed and used in making the determination.

When the determining step performed by the print service computer 152 determines to transmit or make accessible the basic print image data for a basic print image of the given item obtaining, it accesses a coupon database or a gift certificate database or a voucher database or other appropriate database for the given item, represented for convenience by block 160, to obtain basic print image data for the basic print image for the given item.

In embodiments, the print service computer 152 transmits or makes accessible as represented by line 156, via the one or more networks, the basic print image data for the basic print image containing a print request element within the basic print image but missing an essential element for validation, to the device 110. In embodiments, a print request element may be contained in the image data obtained from the database 160. In embodiments, the print request element may be added by the print service computer 152 to the image data to obtain the basic print image data. In embodiments, the print request element may simply comprise a button within the basic print image. The configuration of the print request element may take a variety of different forms, and is not limiting on the invention. In embodiments, the basic print image data may comprise PDF data.

In embodiments, the basis print image data for the coupon or other print document may be secured. In embodiments, this securing feature may be accomplished via keys, provided, for example, by signing the document. In embodiments, a key may be provided to prevent the document from being modified without the key. In embodiments, a key may be provided to allow communication with the print server 152. In embodiments, a key may be provided to allow communication with a print spooler of the consumer device 190. In embodiments, the document or file may be secured, for example, using Adobe® LiveCycle.™ As another example, LockLizard® may be used to secure a PDF file.

In embodiments, the print service computer 152 may receive, via the one or more networks, activation data indicating that the print request element within the basic print image has been activated, indicating a command to print the given item.

In embodiments, the print service computer 152 may record or having recorded in the database 160 print number data based on a number of times the activation data has been received for the given item, with the print number data associated with the given item and the ID that had been created based at least in part on the X parameters. In embodiments, a number held in a register representing the print number data for the given item for that ID may be advanced by one every time the activation data for the print request element is received for the given item.

In embodiments, the print service computer 152 may determine, whether or not the print number data exceeds the threshold value. In embodiments, this operation may be performed by a comparator configured in the print service computer 152. An advantage of this second determining step of comparing print number data to a threshold value is to detect multiple activations of the print request element by the device at this stage in the process.

When the print service computer 152 has determined that the print number data does not exceed the threshold value, the print service computer 152 may obtain the missing essential element for validation. In embodiments, the obtaining operation by the print service computer 152 may comprise accessing the database 160 or another server to obtain the missing essential element for validation, e.g., a number represented in graphical image date so that the missing essential element is readable from the printed item by a point of sale operation. In embodiments, the obtaining operation by the print service computer 152 may comprise generating graphical image date representing the missing essential element for validation based on one or more parameters associated with the offer. In embodiments, the obtaining operation by the print service computer 152 may comprise obtaining a number from a coupon server or other server and generating graphical image data comprising the missing essential element.

In embodiments, the missing essential element may be added to the basic print image data. In embodiments this addition operation may comprise populating a PDF field within the basic print image with the missing essential element.

In embodiments, the print service computer 152 may transmit or make accessible to a print spooler associated with the device, via the one or more networks, the basic print image data and the missing essential element for validation. In embodiments, this transmission element may comprise explicitly bypassing or deactivating any dialog or print settings communication with the device on printing parameters. In embodiments, this disabling of the dialog operation with the consumer device may be accomplished via a script that is executed as part of the print service computer operation. In embodiments, this bypassing or deactivation operation prevents a preview of the basic print image combined with the missing essential element for validation. Note that in some embodiments, a preview may still be possible by selecting the print button in a File menu or by clicking a Print icon, but the resulting preview will not contain the missing essential element, so that a copy of the preview image cannot be validated by a point of sale location.

In embodiments, a script may be executed at some point during the process to determine that the consumer printer 190 designated by the consumer device is, in fact, a permitted printer, and not a non-allowed device or program, such as a Print To PDF program or a Microsoft XPS to File program, to name a few. In embodiments, this script may be executed, as represented by block 170, and the data for the consumer printer 190 sent via line 172 to print server 152 for a determination whether the consumer printer 190 is an allowed printer. Print authorization or non-authorization command is represented by line 174.

Accordingly, in embodiments, the print server 152 may be configured to determine, by the one or more computers via a communication with the print spooler via the one or more networks, whether it is an allowed printer or not an allowed printer, and to prevent, by the one or more computers, transmitting or making accessible to the print spooler associated with the device, both the basic print image data and the missing essential element for validation, or only the basic print image data, when it is determined that the print spooler is not an allowed printer.

In embodiments, the print service computer 152 may further be configured to generate a PIN. In embodiments, the PIN generation operation may comprise using a random number generator or other convenient process to generate the PIN. In embodiments, the generation of the PIN may comprise adding the PIN to the missing essential element, with the resulting PIN and missing essential element combination to be printed on the coupon, or gift certificate or voucher, or other item.

In embodiments of the website 120, the one or more computers configuring the website may be configured to initiate, when the access data is received at the website server, an addition of a tracking cookie on the device via the one or more networks.

In embodiments of the website 120, the one or more computers configuring the website may be configured to detect via the one or more networks, when the access data is received on the website, a tracking cookie on the device associated with the server method, and to obtain from the tracking cookie using a script, via the one or more networks, history data including print number data for one or more items that may be printed and validated. In embodiments, website 120 may be configured to determine, based at least in part on this history data, whether there is print number data for the given item, and to compare, via a comparator configured in the one or more computers, the print number data for the given item with the print threshold value. In embodiments, the determining whether or not to transmit or make accessible the base print image data by the print service computer 152 may be based at least in part on results from the comparing step of the print number data from the tracking cookie.

In embodiments of the system and method, the one or more computers may be configured to access the device identity computer 141, and to select, by the one or more computers via the one of more networks, a plurality of the parameters on the device identity computer, and set, via the one of more networks, respective score values for the respective parameters selected, for use by the device identity computer in determining the risk data. The score values for the different parameters may be utilized, e.g., added, to obtain a risk value. For example, geographic scoring may be used, with higher risk areas or areas where the coupon or other item is not available or authorized, may be given a high risk score, e.g., a consumer device from outside the U.S. or Canada be given a top risk score of 10. Other risk parameters may comprise VPN usage, evidence of previously deleted cookies, browser language, software version numbers of browser plug-ins, etc. If a particular risk parameter selected and given a customized score is not available from the data obtained from the script associated with the web server 120, then a top risk score may be given for this unavailable parameter.

Figure 2:
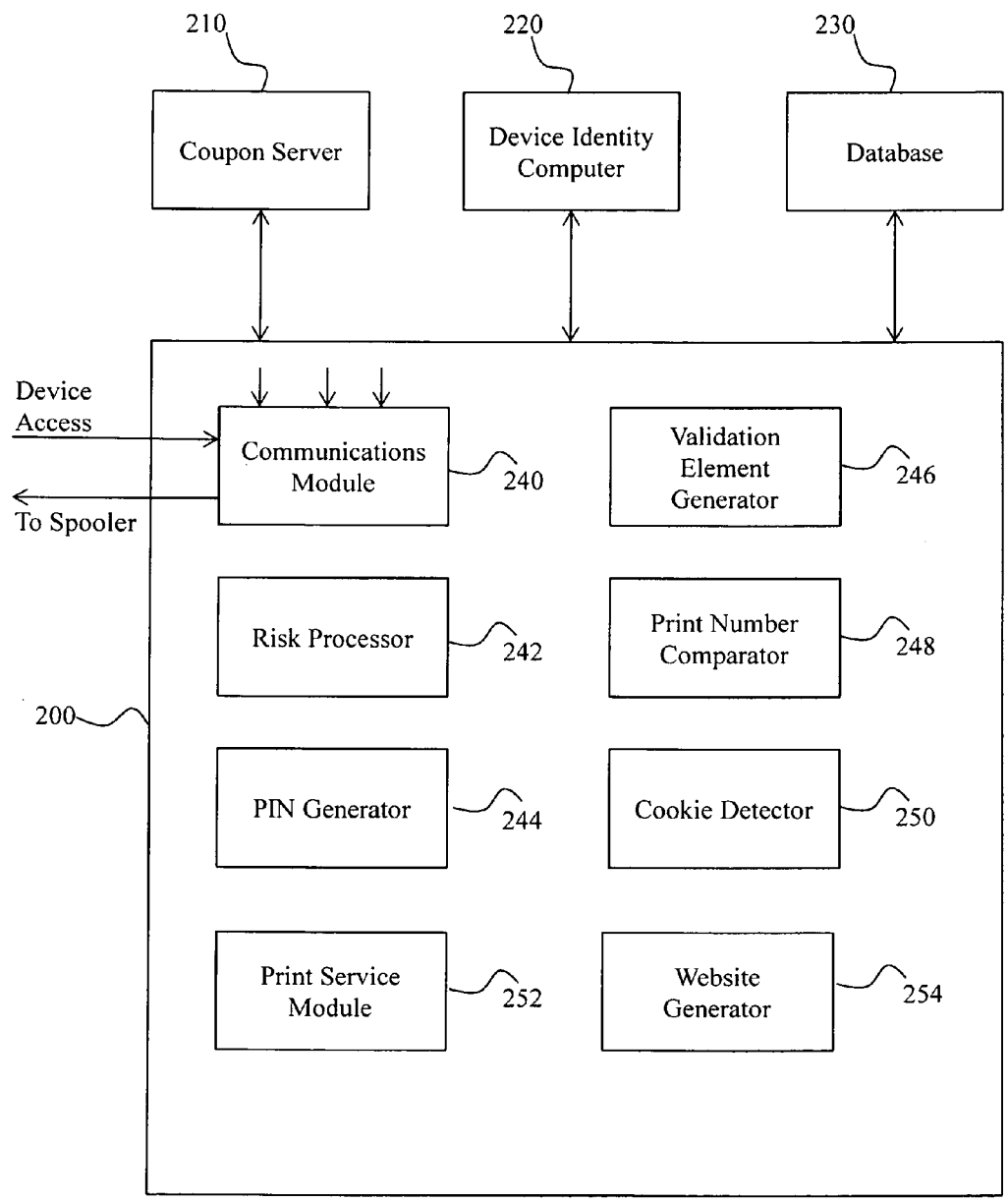
FIG. 2 is a schematic block diagram of embodiments of a server configuration that may be used to implement embodiments of the invention.

Referring to FIG. 2, embodiments of the one or more computers that configure the system are represented. In embodiments, the one or more computers may comprise a communications module 240 for communicating locally or via one or more networks with other computers, servers and databases.

FIG. 2 in embodiments may further comprise a risk processor 242 for determining risk based on one or more parameters obtained from cookie data, and/or the device identity computer, and/or compiled from one or more databases. In embodiments, a risk score may be obtained or generated and compared in a comparator to a risk threshold value.

FIG. 2 in embodiments may further comprise a PIN generator 244 for generating a PIN based on one or more algorithms.

FIG. 2 in embodiments may further comprise a website generator 254 for generating and serving a website for coupons, or gift certificates, or vouchers, and/or other items.

FIG. 2 in embodiments may further comprise a print service module 252 for performing the various operation discussed above.

FIG. 2 in embodiments may further comprise a validation element generator 246 for generating the missing essential element for validation, e.g., generating a 1 or 2 or 3 dimensional bar code based on a plurality of data points relating to the consumer device and/or item parameters, such as budget or limit parameters. In embodiments, this operation may further comprise generating graphical image data for the missing essential element, e.g., generating graphical image data for a 1 or 2 or 3 dimensional bar code to represent a number or to represent other missing essential element data.

FIG. 2 in embodiments may further comprise a print number comparator 248 for comparing a stored print number obtained from a database, and/or a cookie, and/or a register, to a print threshold value.

FIG. 2 in embodiments may further comprise a cookie detector 250 for detecting and obtaining via the communications module cookie, data from the device that has accessed the website.

Figure 3A:
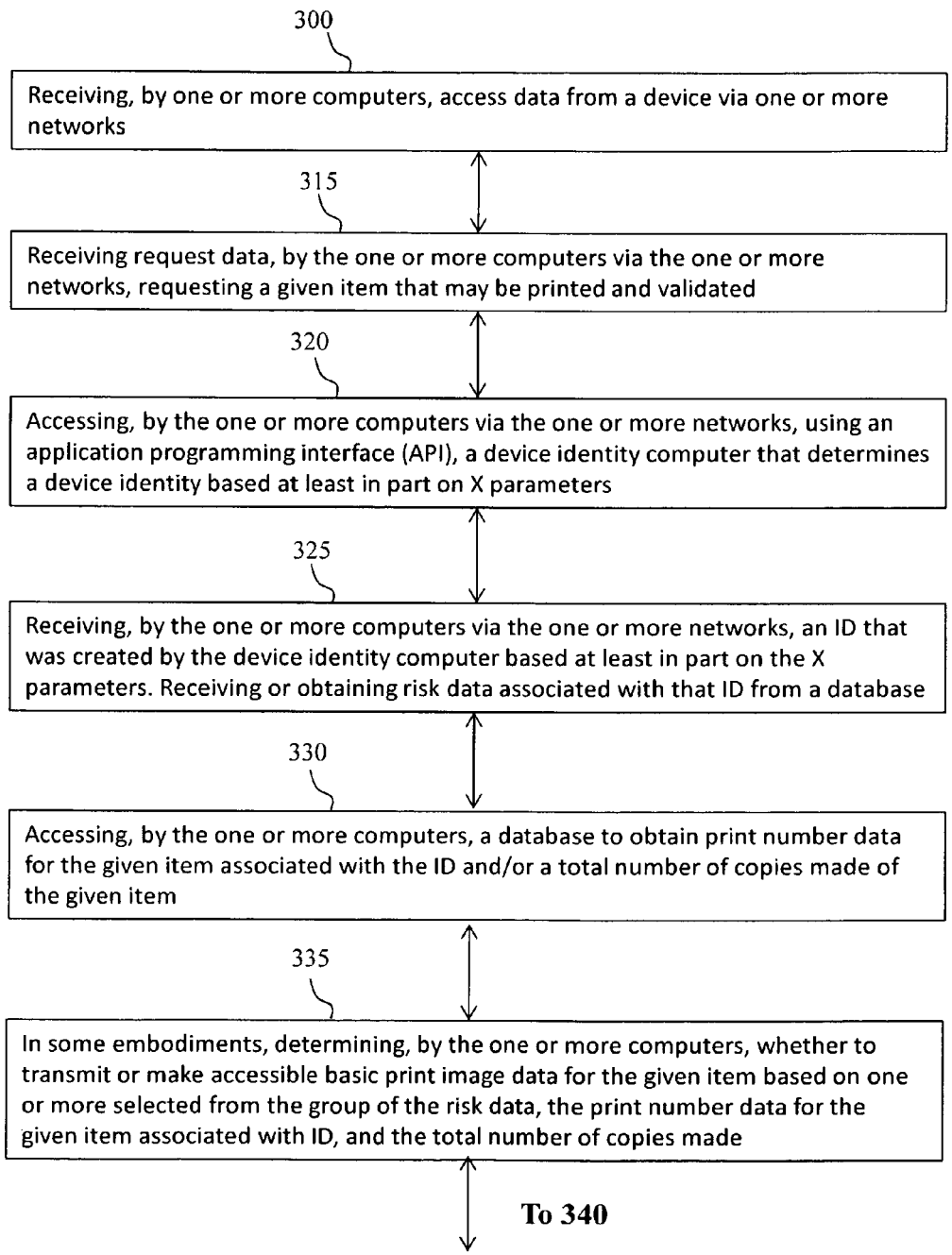
FIGS. 3A and 3B are schematic block diagram of embodiments of a flowchart that may be used to implement the invention.
Figure 3B:
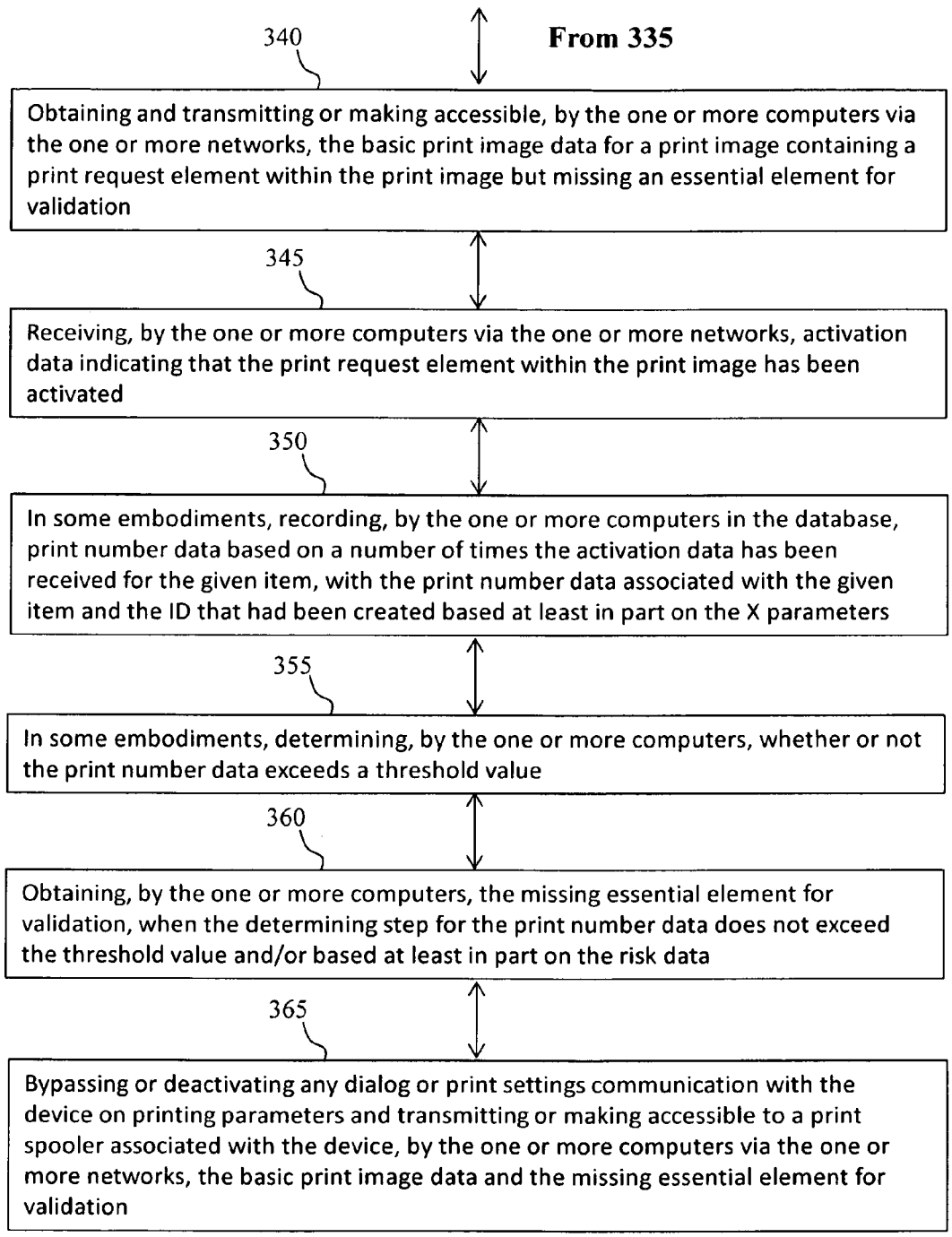

Referring to FIG. 3, embodiments of a process consistent with the invention are disclosed. Block 300 represents a computer operation of receiving, by one or more computers, access data from a device via one or more networks. Block 315 represents a computer operation of receiving request data, by the one or more computers via the one or more networks, requesting a given item that may be printed and validated. In embodiments, these accesses may comprise receiving one or more accesses to a website server followed by a request for a given item that can be printed and validated. In embodiments, these steps may comprise a single access.

Block 320 represents a computer operation of accessing, by the one or more computers via the one or more networks, a device identity computer that determines a device identity based at least in part on X parameters, where X is more than 10. In embodiments, X may be 25, or 30 or more, and may vary based on one or more of the parameters obtained. In embodiments, the access operation may be performed using an application programming interface (API). In embodiments, this operation may be performed immediately after the initial access represented by block 300. In embodiments, this operation may be performed after receiving the request data for a given item that may be printed and validated, as represented by block 315.

Block 325 represents a computer operation of receiving, by the one or more computers via the one or more networks, an ID that was created by the device identity computer based at least in part on the X parameters. In embodiments, risk data may be received or obtained associated with that ID. In embodiments, the risk data may be obtained from the device identity computer. In embodiments, the risk data may be obtained from another computer, and/or may be obtained from a database, and/or may be generated in part or in whole.

Block 330 represents a computer operation of accessing, by the one or more computers, a database that a database to obtain print number data based on a number of copies of the given item that are associated with the ID and/or to obtain a total number of copies made of the given item. In embodiments, the total number of copies made of the given item may be compared to a copy budget threshold set by the coupon or other given item sponsor. In some embodiments, this operation may be performed at the end of the process just before the full given item is transmitted.

Block 335 represents a computer operation of determining, by the one or more computers, based at least in part on one or more selected from the group of the risk data, the print number data based on the number of copies of the given item associated with ID, and the total number of copies made of the given item, whether or not to transmit or make accessible basic print image data for a basic print image of the given item. In embodiments, the determination may always be made by based at least in part on the risk data. In embodiments, this determination may always be made based on all of the listed elements in the group. In other embodiments, this determining operation may instead be performed at the end of the process and the data may be used to determine whether a missing essential element for validation (to be discussed below) is obtained for this request.

Block 340 represents a computer operation of obtaining and transmitting or making accessible, by the one or more computers via the one or more networks, the basic print image data for the basic print image containing a print request element within the basic print image but missing an essential element for validation, when the determining step determines to transmit or make accessible the basic print image data for the given item. In other embodiments, the basic print image data for the basic print image containing the print request element within the basic print image but missing an essential element for validation may be transmitted automatically to the device, without an assessment of the risk or the print number data based on the number of copies printed for this ID at that time.

Block 345 represents a computer operation of receiving, by the one or more computers via the one or more networks, activation data indicating that the print request element within the basic print image has been activated.

Block 350 represents a computer operation of recording or having recorded, by the one or more computers in the database, print number data based on a number of times the activation data has been received for the given item, with the print number data associated with the given item and the ID that had been created based at least in part on the X parameters. In embodiments, this step may not be performed.

Block 355 represents a computer operation of determining, by the one or more computers, whether or not the print number data exceeds a threshold value. In embodiments, this step may not be performed.

Block 360 represents a computer operation of obtaining, by the one or more computers, the missing essential element for validation. In embodiments, the missing essential element may be obtained only when the determining step for the print number data does not exceed the threshold value. In embodiments, the missing essential element may be obtained based at least in part on the risk data.

As noted, in embodiments, the missing essential element for validation step may be obtained by accessing a database to obtain graphical image data comprising the missing essential element. In embodiments, the missing essential element for validation step may be obtained by generating, by the one or more computers, the missing essential element. In embodiments, the obtaining operation by the print service computer 152 may comprise obtaining a number from a coupon server or other server and generating graphical image data comprising the missing essential element. In embodiments, the generating operation may further comprise generating, by the one or more computers, a PIN, and adding, by the one or more computers, the PIN to the missing essential element for printing on the coupon.

In embodiments, the missing essential element may be used to populate a PDF field within the basic print image.

Block 365 represents a computer operation of bypassing or deactivating any dialog or print settings communication with the device on printing parameters and transmitting or making accessible to a print spooler associated with the device, by the one or more computers via the one or more networks, the basic print image data and the missing essential element for validation. In embodiments, the dialog communication with the consumer device 110 may be bypassed or deactivated by executing a script on the printer service computer 152.

In embodiments, the process may further comprise the steps of adding, by the one or more computers, the missing essential element into a field within the basic print image. As noted, in embodiments the addition of the missing essential element to the basic print image may comprise populating a field in a PDF of the basic print image.

In embodiments, the process may further comprise determining, by the one or more computers via a communication with the print spooler or with a database, via the one or more networks, whether it is an allowed printer or not an allowed printer. When it is determined that the printer is not an allowed printer, then preventing, by the one or more computers, transmitting or making accessible to the print spooler associated with the device, in some embodiments both the basic print image data and the missing essential element for validation, or in other embodiments the missing essential element. In embodiments, this operation is performed only after the print button within the PDF is clicked.

In embodiments, the process may further comprise initiating when the access data is received, by the one or more computers and the one or more networks, an addition of a tracking cookie on the device.

In embodiments, the process may further comprise detecting, when the access data is received, by the one or more computers via the one or more networks, a tracking cookie on the device associated with the server method, obtaining from the tracking cookie, by the one or more computers via the one or more networks, history data including print number data for one or more items that may be printed and validated, determining, based at least in part on the history data, whether there is print number data for the given item, and comparing, by the one or more computers, the print number data for the given item with the threshold value, and wherein the determining whether or not to transmit or make accessible the base print image data is based at least in part on results from the comparing step.

In embodiments, the process may further comprise selecting, by the one or more computers via the one or more networks, a plurality of the Y parameters on the device identity computer, and setting or having set, by the one or more computers via the one of more networks, respective threshold values for the respective parameters selected, for use by the device identity computer in determining risk. For example, a risk score may be set by the one or more computers, based on the Time Zone of the device, the Geographical location of the device, a last updated date of the device IP address, etc.

In embodiments, method for operating a server method on one or more computers, for passive print security, consistent with the invention comprises:

receiving, by one or more computers, access data from a device via one or more networks;

receiving request data from the device, by the one or more computers via the one or more networks, requesting a given item that may be printed and validated;

accessing, by the one or more computers via the one or more networks, a device identity computer that determines a device identity based at least in part on X parameters, where X is more than 10 parameters;

receiving, by the one or more computers via the one or more networks, an ID that was created by the device identity computer based at least in part on the X parameters;

receiving or obtaining, by the one or more computers, risk data associated with that ID;

accessing, by the one or more computers, a database that to obtain print number data based on a number of copies of the given item that are associated with the ID;

obtaining and transmitting or making accessible, by the one or more computers via the one or more networks, the basic print image data for the basic print image containing a print request element within the basic print image but missing an essential element for validation;

receiving, by the one or more computers via the one or more networks, activation data indicating that the print request element within the basic print image has been activated;

determining, by the one or more computers, whether or not the print number data based on the number of copies of the given item associated with the ID exceeds a threshold value;

determining, by the one or more computers, whether or not to obtain the missing essential element, based at least in part on the risk data and/or whether the print number data based on the number of copies exceeds the threshold value;

obtaining, by the one or more computers, the missing essential element for validation, based at least in part on determining to obtain the missing essential element in the determining step; and bypassing or deactivating any dialog or print settings communication with the device on printing parameters and transmitting or making accessible to a print spooler associated with the device, by the one or more computers via the one or more networks, the basic print image data and the missing essential element for validation.

Figure 4:
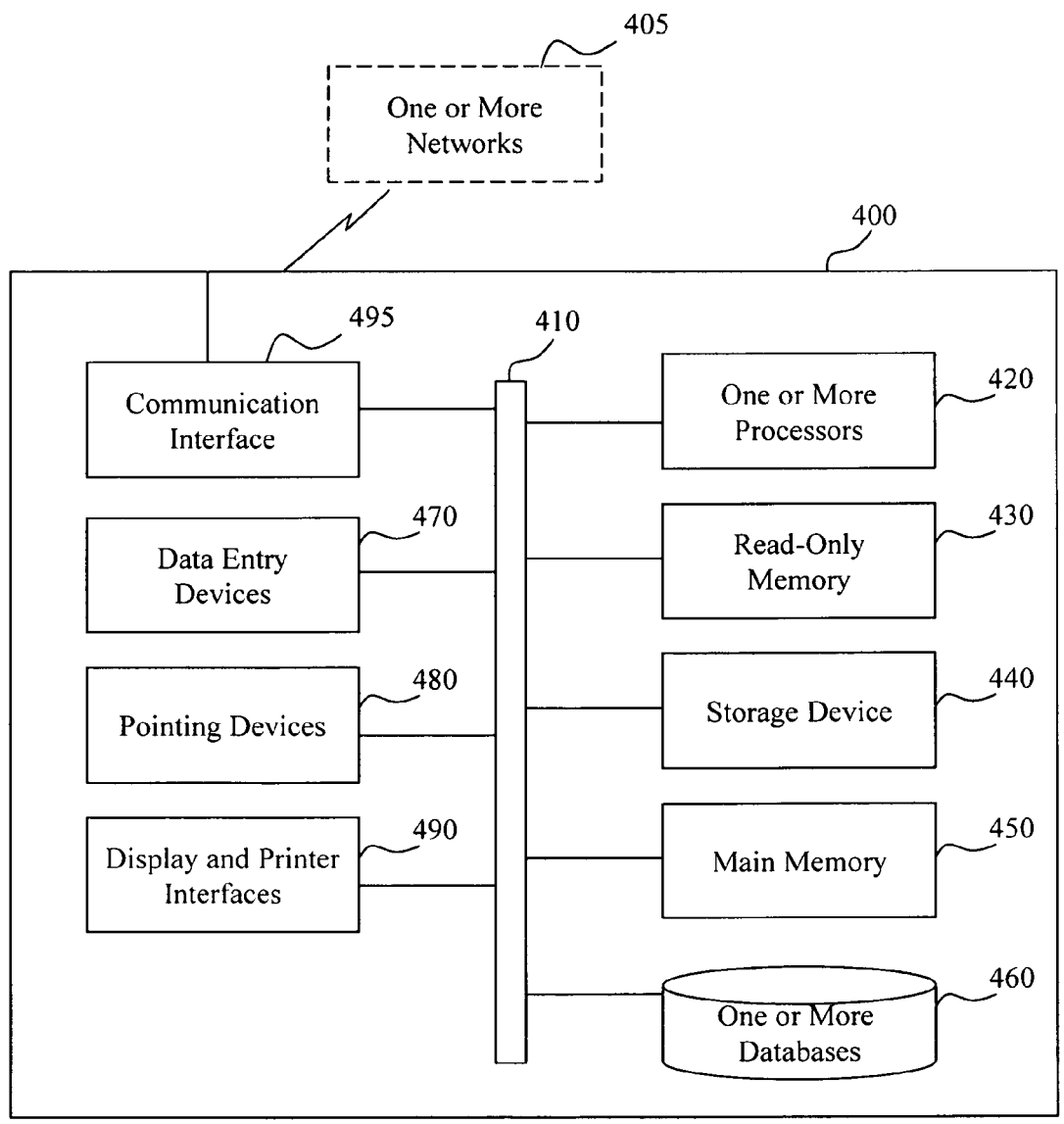
FIG. 4 is a schematic block diagram of a computer system that may be used to implement the present invention.

FIG. 4 is a block diagram illustrating embodiments of the system of FIG. 1, generally designated by reference number 400 in FIG. 4. In embodiments, the system 400 according to the present invention may be communicatively coupled to one or more networks 405 via a communication interface 495. The one or more networks 405 may represent a generic network, which may correspond to a local area network (LAN), a wireless LAN, an Ethernet LAN, a token ring LAN, a wide area network (WAN), the Internet, a proprietary network, an intranet, a telephone network, a wireless network, to name a few, and any combination thereof. Depending on the nature of the network employed for a particular application, the communication interface 495 may be implemented accordingly. The network 405 serves the purpose of delivering information between connected parties.

The system 400 may comprise, in some embodiments, a computing platform for performing, controlling, and/or initiating computer-implemented operations, for example, via a server and the one or more networks 405. The computer platform may comprise system computers and other party computers. An exemplary system 400 may operate under the control of computer-executable instructions to carry out the process steps described herein. Computer-executable instructions comprise, for example, instructions and data which cause a general or special purpose computer system or processing device to perform a certain function or group of functions. Computer software for the system 400 may comprise, in embodiments, a set of software objects and/or program elements comprising computer-executable instructions collectively having the ability to execute a thread or logical chain of process steps in a single processor, or independently in a plurality of processors that may be distributed, while permitting a flow of data inputs/outputs between components and systems.

The system 400 may include one or more personal computers, workstations, notebook computers, servers, mobile computing devices, handheld devices such as mobile telephones and PDA's, multi-processor systems, networked personal computers, minicomputers, mainframe computers, personal data assistants, Internet appliances (e.g., a computer with minimal memory, disk storage and processing power designed to connect to a network, especially the Internet, etc.), or controllers, to name a few.

The system 400 may comprise, in embodiments, a bus 410 or other communication component that couples the various system elements 420-495, and is configured to communicate information between the various system elements 420-495.

As shown in FIG. 4, one or more computer processors 420 may be coupled with the bus 410 and may be configured to process and handle information and execute instructions. The system 400 may include a main memory 450, such as a Random Access Memory (RAM) or other dynamic storage device, coupled to the bus 400, for storing information and instructions to be executed by the one or more processors 420. The main memory 450 also may be used for storing temporary variables or other intermediate information during execution of instructions by the one or more processors 420.

The system 400 further may include a Read-Only Memory (ROM) 430 or other static storage device (e.g., EPROM, EAROM, EEPROM, PROM, flash, and the like) coupled to the bus 410 for storing static information and instructions for the one or more processors 420. Furthermore, a storage device 440, such as a magnetic disk or optical disk, such as a CD-ROM or other optical media may be provided and coupled to the bus 410 for storing information and instructions.

In addition to the ROM 430, one or more databases 460 may be coupled to the bus 410 for storing static information and software instructions. Information stored in or maintained in the database 460 may be provided in conformance with a database system format such as, but not limited to, the Structured Query Language (SQL) format. Database query and access instructions, for example, in the form of one or more scripts, may be used which, when executed by a processor such as the processor 420, serve to access, store and retrieve data maintained in the database 460 according to the instructions contained in the script.

Furthermore, the system 400 may comprise application software instructions which may implement a user interface portion for generating interactive pages or display screens by which a user/participant may provide data to and receive information from the system 400 and the database 460 using a human-machine interface. In embodiments, interactive pages may include user dialog boxes for accepting user entered information. In particular, the human-machine interface may comprise a Graphical User Interface (GUI) portion for prompting the user to enter data by providing an interactive dialog box or message box instructing the user to enter particular data, or to select from among a multitude of options provided using a pull-down menu. In embodiments, a user may interact with the system 400 via the graphical user interface by using a pointing device and/or data entry device. The GUI portion may place the output of the system 400 in a format for presentation to a user via the display. In embodiments, the GUI may be implemented as a sequence of Java instructions.

A data entry device 470, including alphanumeric and other keys, or a pointing device such as a mouse or trackball, or a scanner, to name a few, may be coupled to the bus 410 for communicating information and command selections to the processor 420. The data entry device 470 may be coupled to the bus 410 via an interface (not shown), wherein the interface may be, for example, a serial port, an RS-232 port, or the like. In addition, the interface may be a wireless interface and provide connection-less communication via, for example, Bluetooth communication.

The system 400 may be coupled via the bus 410 to a display or printer 490 for outputting information to a computer user. In addition, a user may use the display (e.g., touch screen) or a scanner to provide information to the system 400.

In embodiments of the present invention, the various program operations as described herein may be provided by the system 400 in response to the one or more processors 420 executing one or more sequences of computer-readable instructions contained in the main memory 450. Such instructions may be read into the main memory 450 from another computer-readable medium, such as the ROM 430, the storage device 440, or the database 460. Execution of the sequences of instructions contained in the main memory 450 may cause the one or more processors 420 to perform the process steps described herein. It should be appreciated that embodiments of the system 400 may perform fewer or additional processes as compared to those described herein. As noted, the one or more processors 420 may be arranged in a multi-processing arrangement. In embodiments, hard-wired circuitry may be used in place of or in combination with software instructions to implement the invention. Thus, embodiments of the invention are not limited to any specific combination of hardware circuitry and software.

The term "computer-readable medium" or "computer-readable storage medium," as used herein refers to any medium that is computer-readable and participates in storing and providing instructions to the processor 420 for execution. Such a medium may be removable or non-removable and may take many forms, including, but not limited to, non-volatile media and volatile media. Non-volatile media include, for example, optical or magnetic disks, such as the storage device 440. Volatile media include dynamic memory, such as the main memory 450. Common forms of computer-readable media include, for example, floppy disk, a flexible disk, hard disk, magnetic tape, any other magnetic medium, a Compact Disc Read Only Memory (CD ROM), Digital Video Disc (DVD) or any other optical medium, punch cards, paper tape, any other physical medium with patterns of holes, a Random Access Memory (RAM), a Programmable Read Only Memory (PROM), an Erasable Programmable Read Only Memory (EPROM), a Flash EPROM, any other memory chip or cartridge, or any other tangible medium from which a computer can read computer instructions. Combinations of the above are also included within the scope of machine-readable media. Machine-executable instructions comprise, for example, instructions and data which cause a general purpose computer, special purpose computer, or a special purpose processing machine to perform a certain function or group of functions. It should be appreciated that the one or more databases 460, the main memory 450, the storage device 440, and the ROM 430 may, in some embodiments, be described as a "computer-readable medium" or a "computer-readable storage medium."

As previously noted, the system 400 also comprises a communication interface 495 coupled to the bus 410 for providing one-way, two-way or multi-way data communication with the network 405, and/or communication directly with other devices. In embodiments, the communication interface 495 may comprise a modem, a transceiver Integrated Services Digital Network (ISDN) card, a WAN card, an Ethernet interface, or the like, to provide a data communication connection to a corresponding type of communication medium. As another example, the communication interface 495 may comprise a LAN card to provide a data communication connection to a compatible LAN. Wireless links may also be implemented. In such wireless links, the communication interface 495 may communicate with a base station communicatively coupled to a network server. In any such implementation, the communication interface 495 sends and receives electrical, electromagnetic, radio, infrared, laser, or optical signals that carry digital data streams representing various types of information. Any combination of the above interfaces may also be implemented.

In embodiments, the communication interface 495 may be communicatively coupled to a web server configured in the one or more processors 420 to generate and output web content that is suitable for display using a web browser at a computing device. In embodiments, the server may generate and transmit requested information through the communication interface 495 to a requesting terminal via Hypertext Transfer Markup Language (HTML) formatted pages, eXtensible Markup Language (XML) formatted pages, or the like, which may be provided as World Wide Web pages that may enable navigation by hyperlinks. The server program may be used to receive commands and data from clients' terminals, access and process data from various sources, and output computer-executable instructions and data using the network 405. Interactive pages transmitted and received using the network 405 may conform to necessary protocols.

The web server configured in the one or more processors 420, in embodiments, may correspond to a secure web application server behind a web server program that a service provider employs to run one or more web based application programs (e.g., an application program to carry out the methods described above) in a secure fashion. Such a secure web application server may be configured to execute one or more web based application programs, responsive to commands and data received from the clients (via a web page supported by the web server), and providing data and results to the clients. The web server and the web application server may be implemented using a single computing platform. Alternatively, it may also be implemented using multiple separate and distributed computing platforms.

As noted above, embodiments of the present invention may be practiced in a networked environment using logical connections to one or more remote computers having processors. Logical connections may include a local area network (LAN) and a wide area network (WAN) that are presented here by way of example and not limitation. Such networked environments are in office-wide or enterprise-wide computer networks, intranets and the Internet, and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. Embodiments of the invention may also be practiced in distributed computing environments where tasks are performed by local and remote processing devices that are linked (either by hard-wired links, wireless links, or by a combination of hardwired or wireless links) through a communications network. In a distributed computing environment, program modules may be located in both local and remote memory storage devices.

Embodiments of the invention have been described in the general context of method steps which may be implemented in embodiments by a program product including machine-executable instructions, such as program code, for example in the form of program modules executed by machines in networked environments. Generally, program modules include routines, programs, objects, components, data structures, etc., that perform particular tasks or implement particular data types. Multi-threaded applications may be used, for example, based on Java or C++. Machine-executable instructions, associated data structures, and program modules represent examples of program code for executing steps of the methods disclosed herein. The particular sequence of such executable instructions or associated data structures represent examples of corresponding acts for implementing the functions described in such steps.

It should be noted that although the flow charts provided herein and the claims show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention may be accomplished with programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations.

All components, modes of communication, and/or processes described heretofore are interchangeable and combinable with similar components, modes of communication, and/or processes disclosed elsewhere in the specification, unless an express indication is made to the contrary. It is intended that any structure or step of an embodiment disclosed herein may be combined with other structure and or method embodiments to form further embodiments with this added element or step While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

We claim:

1. A program product for operating a server method on one or more computers, for passive print security, comprising a non-transitory computer-readable medium holding computer-readable code thereon, that when executed by the one or more computers, causes the one or more computers to perform the steps:

receiving, by the one or more computers, access data from a device via one or more networks;

receiving request data from the device, by the one or more computers via the one or more networks, requesting a given item that may be printed and validated;

accessing, by the one or more computers via the one or more networks, a device identity computer that determines a device identity based at least in part on X parameters, where X is more than 10 parameters;

receiving, by the one or more computers via the one or more networks, an ID that was created by the device identity computer based at least in part on the X parameters;

receiving or obtaining by the one or more computers via the one or more networks, risk data associated with that ID;

accessing, by the one or more computers, a database to obtain print number data based on one or more selected from a group of a number of copies of the given item that are associated with the ID and a total number of copies;

determining, by the one or more computers, based at least in part on one or more selected from the group of the risk data, the print number data based on the number of copies of the given item associated with ID, and the total number of copies made of the given item, whether or not to transmit or make accessible basic print image data for a basic print image of the given item;

obtaining and transmitting or making accessible, by the one or more computers via the one or more networks, the basic print image data for the basic print image containing a print request element within the basic print image but missing an essential element for validation, when the determining step determines to transmit or make accessible the basic print image data for the given item;

receiving, by the one or more computers via the one or more networks, activation data indicating that the print request element within the basic print image has been activated;

recording or having recorded, by the one or more computers in the database, print number data based on a number of times the activation data has been received for the given item, with the print number data associated with the given item and the ID that had been created based at least in part on the X parameters;

determining, by the one or more computers, whether or not the print number data exceeds a threshold value;

obtaining, by the one or more computers, the missing essential element for validation, when the determining step for the print number data does not exceed the threshold value; and bypassing or deactivating any dialog or print settings communication with the device on printing parameters and transmitting or making accessible to a print spooler associated with the device, by the one or more computers via the one or more networks, the basic print image data and the missing essential element for validation.

2. The program product as defined in claim 1, further comprising computer-readable program code to perform the step:

adding, by the one or more computers, the missing essential element into a field within the basic print image.

3. The program product as defined in claim 1, further comprising computer-readable program code to perform the steps:

determining, by the one or more computers via a communication with the print spooler via the one or more networks, whether it is an allowed printer or not an allowed printer; and preventing, by the one or more computers, transmitting or making accessible to the print spooler associated with the device, both the basic print image data and the missing essential element for validation, when it is determined that the print spooler is not an allowed printer.

4. The program product as defined in claim 1, wherein the obtaining the missing essential element for validation step comprises generating, by the one or more computers, the missing essential element.

5. The program product as defined in claim 1, further comprising computer-readable program code to perform the steps:

generating or obtaining, by the one or more computers, graphical image data for a PIN; and adding, by the one or more computers, the graphical image data for the PIN to the missing essential element for printing on the coupon.

6. The program product as defined in claim 1, wherein the obtaining the missing essential element for validation step comprises accessing, by the one or more computers, a coupon server.

7. The program product as defined in claim 1, wherein the obtaining the missing essential element for validation step comprises:

accessing, by the one or more computers, a coupon server to obtain a number; and generating, by the one or more computers, graphical image data representing the number as the missing essential element for validation.

8. The program product as defined in claim 1, further comprising computer-readable code to perform the step:

initiating when the access data is received, by the one or more computers and the one or more networks, an addition of a tracking cookie on the device.

9. The program product as defined in claim 1, further comprising computer-readable code to perform the steps:

detecting, when the access data is received, by the one or more computers via the one or more networks, a tracking cookie on the device associated with the server method;

obtaining from the tracking cookie, by the one or more computers via the one or more networks, history data including print number data for one or more items that may be printed and validated;

determining, based at least in part on the history data, whether there is print number data for the given item;

comparing, by the one or more computers, the print number data for the given item with the threshold value; and wherein the determining whether or not to transmit or make accessible the base print image data is based at least in part on results from the comparing step.

10. The program product as defined in claim 1, further comprising computer-readable program code to perform the steps:

selecting, by the one or more computers via the one of more networks, a plurality parameters on the device identity computer; and setting or having set, by the one or more computers via the one of more networks, respective score values for the respective parameters selected, for use by the device identity computer in determining risk.

11. The program product as defined in claim 1, wherein the basic print image data is PDF data.

12. The program product as defined in claim 1, wherein the essential element is bar code data.

13. The program product as defined in claim 1, wherein the obtaining the basic print image data step comprises accessing, by the one or more computers, one selected from the group of a coupon server, a gift certificate server, and a voucher server.

14. A system for passive print security, comprising:
one or more computers configured with the following components:
    a communications component configured to receive, by the one or more computers via one or more networks, access data from a device;
    the communications component configured to receive request data from the device, by the one or more computers via the one or more networks, requesting a given item that may be printed and validated;
    the communications component configured to access, by the one or more computers via the one or more networks, a device identity computer that determines a device identity based at least in part on X parameters, where X is more than 10 parameters;
    the communications component configured to receive, by the one or more computers via the one or more networks, an ID that was created by the device identity computer based at least in part on the X parameters;
    the communications component configured to receive or obtain, by the one or more computers via the one or more networks, risk data associated with that ID;
    the communications component configured to access, by the one or more computers, a database to obtain print number data based on one or more selected from a group of a number of copies of the given item that are associated with the ID and a total number of copies made of the given item;
    a processor configured, by the one or more computers, to determine based at least in part on one or more selected from the group of the risk data, the print number data based on the number of copies of the given item associated with ID, and the total number of copies made of the given item, whether or not to transmit or make accessible basic print image data for a basic print image of the given item;
    the processor configured to obtain and transmit or make accessible, by the one or more computers via the one or more networks, the basic print image data for the basic print image containing a print request element within the basic print image but missing an essential element for validation, when the determining step determines to transmit or make accessible the basic print image data for the given item;
    the communications component configured to receive, by the one or more computers via the one or more networks, activation data indicating that the print request element within the basic print image has been activated;
    the processor configured to record or having recorded, by the one or more computers in the database, print number data based on a number of times the activation data has been received for the given item, with the print number data associated with the given item and the ID that had been created based at least in part on the X parameters;
    the processor configured to determine, by the one or more computers, whether or not the print number data exceeds a threshold value;
    the processor configured to obtain, by the one or more computers, the missing essential element for validation, when the determining operation for the print number data does not exceed the threshold value; and
    the processor configured to bypass or deactivate any dialog or print settings communication with the device on printing parameters and to transmit or make accessible to a print spooler associated with the device, by the one or more computers via the one or more networks, the basic print image data and the missing essential element for validation.

15. The system as defined in claim 14, wherein the processor is configured to:
    determine, by the one or more computers via a communication with the print spooler via the one or more networks, whether it is an allowed printer or not an allowed printer; and
    prevent, by the one or more computers, transmitting or making accessible to the print spooler associated with the device, both the basic print image data and the missing essential element for validation, when it is determined that the print spooler is not an allowed printer.

16. The system as defined in claim 14, wherein the processor is configured to obtain the missing essential element by generating, by the one or more computers, the missing essential element.

17. The system as defined in claim 14, wherein the processor is further configured to:
    generate or obtain, by the one or more computers, graphical image data for a PIN; and
    add, by the one or more computers, the graphical image data for the PIN to the missing essential element for printing on the coupon.

18. The system as defined in claim 14, wherein the obtaining the missing essential element for validation operation comprises accessing, by the one or more computers, a coupon server.

19. The system as defined in claim 14,
wherein the processor is configured to:
    detect, when the access data is received, by the one or more computers via the one or more networks, a tracking cookie on the device associated with the server method;
    obtain from the tracking cookie, by the one or more computers via the one or more networks, history data including print number data for one or more items that may be printed and validated;
    determine, based at least in part on the history data, whether there is print number data for the given item; and
further comprising a comparator, configured by the one or more computers, to compare the print number data for the given item with the threshold value; and
wherein the determining whether or not to transmit or make accessible the base print image data operation is based at least in part on results from the comparator.

20. The system as defined in claim 14, wherein the processor is further configured to:
    select, by the one or more computers via the one of more networks, a plurality of the Y parameters on the device identity computer; and
    set or have set, by the one or more computers via the one of more networks, respective score values for the respective parameters selected, for use by the device identity computer in determining risk.

21. A method for operating a server method on one or more computers, for passive print security, comprising:

receiving, by one or more computers, access data from a device via one or more networks;

receiving request data from the device, by the one or more computers via the one or more networks, requesting a given item that may be printed and validated;

accessing, by the one or more computers via the one or more networks, a device identity computer that determines a device identity based at least in part on X parameters, where X is more than 10 parameters;

receiving, by the one or more computers via the one or more networks, an ID that was created by the device identity computer based at least in part on the X parameters;

receiving or obtaining by the one or more computers via the one or more networks, risk data associated with that ID;

accessing, by the one or more computers, a database to obtain print number data based on one or more selected from a group of a number of copies of the given item that are associated with the ID and a total number of copies made of the given item;

determining, by the one or more computers, based at least in part on one or more selected from the group of the risk data, the print number data based on the number of copies of the given item associated with ID, and the total number of copies made of the given item, whether or not to transmit or make accessible basic print image data for a basic print image of the given item;

obtaining and transmitting or making accessible, by the one or more computers via the one or more networks, the basic print image data for the basic print image containing a print request element within the basic print image but missing an essential element for validation, when the determining step determines to transmit or make accessible the basic print image data for the given item;

receiving, by the one or more computers via the one or more networks, activation data indicating that the print request element within the basic print image has been activated;

recording or having recorded, by the one or more computers in the database, print number data based on a number of times the activation data has been received for the given item, with the print number data associated with the given item and the ID that had been created based at least in part on the X parameters;

determining, by the one or more computers, whether or not the print number data exceeds a threshold value;

obtaining, by the one or more computers, the missing essential element for validation, when the determining step for the print number data does not exceed the threshold value; and bypassing or deactivating any dialog or print settings communication with the device on printing parameters and transmitting or making accessible to a print spooler associated with the device, by the one or more computers via the one or more networks, the basic print image data and the missing essential element for validation.

* * * * *